(12) United States Patent
Ritchey et al.

(10) Patent No.: US 12,545,625 B1
(45) Date of Patent: Feb. 10, 2026

(54) METHOD OF FABRICATING A CERAMIC MATRIX COMPOSITE INCLUDING A DIP COATING PROCESS

(71) Applicant: ROLLS-ROYCE HIGH TEMPERATURE COMPOSITES INC., Cypress, CA (US)

(72) Inventors: Andrew J. Ritchey, Cypress, CA (US); Nesredin Kedir, Cypress, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 429 days.

(21) Appl. No.: 18/145,121

(22) Filed: Dec. 22, 2022

Related U.S. Application Data

(60) Provisional application No. 63/265,948, filed on Dec. 23, 2021.

(51) Int. Cl.
| | | |
|---|---|---|
| *C04B 35/565* | (2006.01) | |
| *C04B 35/624* | (2006.01) | |
| *C04B 35/628* | (2006.01) | |
| *C04B 35/64* | (2006.01) | |
| *C04B 41/00* | (2006.01) | |
| *C04B 41/45* | (2006.01) | |

(Continued)

(52) U.S. Cl.
CPC .......... *C04B 35/565* (2013.01); *C04B 35/624* (2013.01); *C04B 35/62863* (2013.01); *C04B 35/62878* (2013.01); *C04B 35/62892* (2013.01); *C04B 35/64* (2013.01); *C04B 41/0081* (2013.01); *C04B 41/4523* (2013.01); *C04B 41/4545* (2013.01); *C04B 41/48* (2013.01); *C04B 41/52* (2013.01); *C04B 41/83* (2013.01); *C04B 41/87* (2013.01); *C04B 41/89* (2013.01); *C04B 2235/3804* (2013.01); *C04B 2235/3821* (2013.01); *C04B 2235/3826* (2013.01); *C04B 2235/48* (2013.01); *C04B 2235/5244* (2013.01); *C04B 2235/616* (2013.01)

(58) Field of Classification Search
CPC .................................................... C04B 35/565
See application file for complete search history.

(56) References Cited

U.S. PATENT DOCUMENTS

| | | | |
|---|---|---|---|
| 2014/0272377 A1* | 9/2014 | Chamberlain | ........ F01D 25/005 427/255.12 |
| 2018/0305263 A1* | 10/2018 | Shim | ....................... C04B 35/52 |

(Continued)

*Primary Examiner* — Robert A Vetere
(74) *Attorney, Agent, or Firm* — Shumaker & Sieffert, P.A.

(57) ABSTRACT

A method of making a ceramic matrix composite (CMC) having an increased carbon content that may show improved resistance to chemical attack from molten silicon is described. The method includes depositing one or more matrix layers comprising boron nitride, silicon nitride, pyrolytic carbon, and/or silicon carbide on a fiber preform comprising one or more silicon carbide fibers. After depositing the matrix layer, the fiber preform is dipped into a coating solution comprising a polymer to deposit a polymeric layer on the matrix layer. After dip coating, the fiber preform is infiltrated with a slurry comprising ceramic particles and/or carbon particles to form a green body; after forming the green body, the polymeric layer is pyrolyzed to form a carbon-containing coating on the matrix layer; and the green body is then infiltrated with a melt comprising silicon or silicon alloy. Upon cooling the melt, a dense CMC formed may be obtained.

19 Claims, 2 Drawing Sheets

(51) Int. Cl.
*C04B 41/48* (2006.01)
*C04B 41/52* (2006.01)
*C04B 41/83* (2006.01)
*C04B 41/87* (2006.01)
*C04B 41/89* (2006.01)

(56) References Cited

U.S. PATENT DOCUMENTS

2019/0256427 A1* 8/2019 Shim ........................ B32B 18/00
2019/0389171 A1* 12/2019 Nelson ..................... B32B 5/024

* cited by examiner

METHOD OF FABRICATING A CERAMIC MATRIX COMPOSITE INCLUDING A DIP COATING PROCESS

RELATED APPLICATION

The present patent document claims the benefit of priority under 35 U.S.C. § 119(e) to U.S. Provisional Patent Application No. 63/265,948, which was filed on Dec. 23, 2021, and is hereby incorporated by reference in its entirety.

TECHNICAL FIELD

The present disclosure relates generally to ceramic matrix composite (CMC) fabrication and more specifically to fabricating a CMC using a dip coating process.

BACKGROUND

Fabrication of ceramic matrix composites may include chemical vapor infiltration (CVI) processes, slurry and melt infiltration steps to densify a fiber preform. Prior to the infiltration steps, the fibers making up the preform may be coated with one or more coatings to protect the fibers and/or improve the performance of the final densified composite. Present CVI processes used to deposit coatings in fabricating CMC components may be time consuming and require high production and processing costs. Accordingly, alternative methods of fabricating CMC components may be contemplated.

BRIEF DESCRIPTION OF THE DRAWINGS

The embodiments may be better understood with reference to the following drawing(s) and description. The components in the figures are not necessarily to scale. Moreover, in the figures, like-referenced numerals designate corresponding parts throughout the different views.

DETAILED DESCRIPTION

A method of making a ceramic matrix composite (CMC) having an increased carbon content that may show improved resistance to chemical attack from molten silicon is described.

The method described in detail below may include replacing a chemical vapor infiltration (CVI) step with a dip coating step to form a carbon-containing coating on a fiber preform in order to reduce processing time and production costs. The carbon-containing coating (described below) may protect the fiber preform from chemical attack by molten silicon during melt infiltration and at the same time, may avoid the use of low temperature oxide formers, such as boron.

Figure 1:
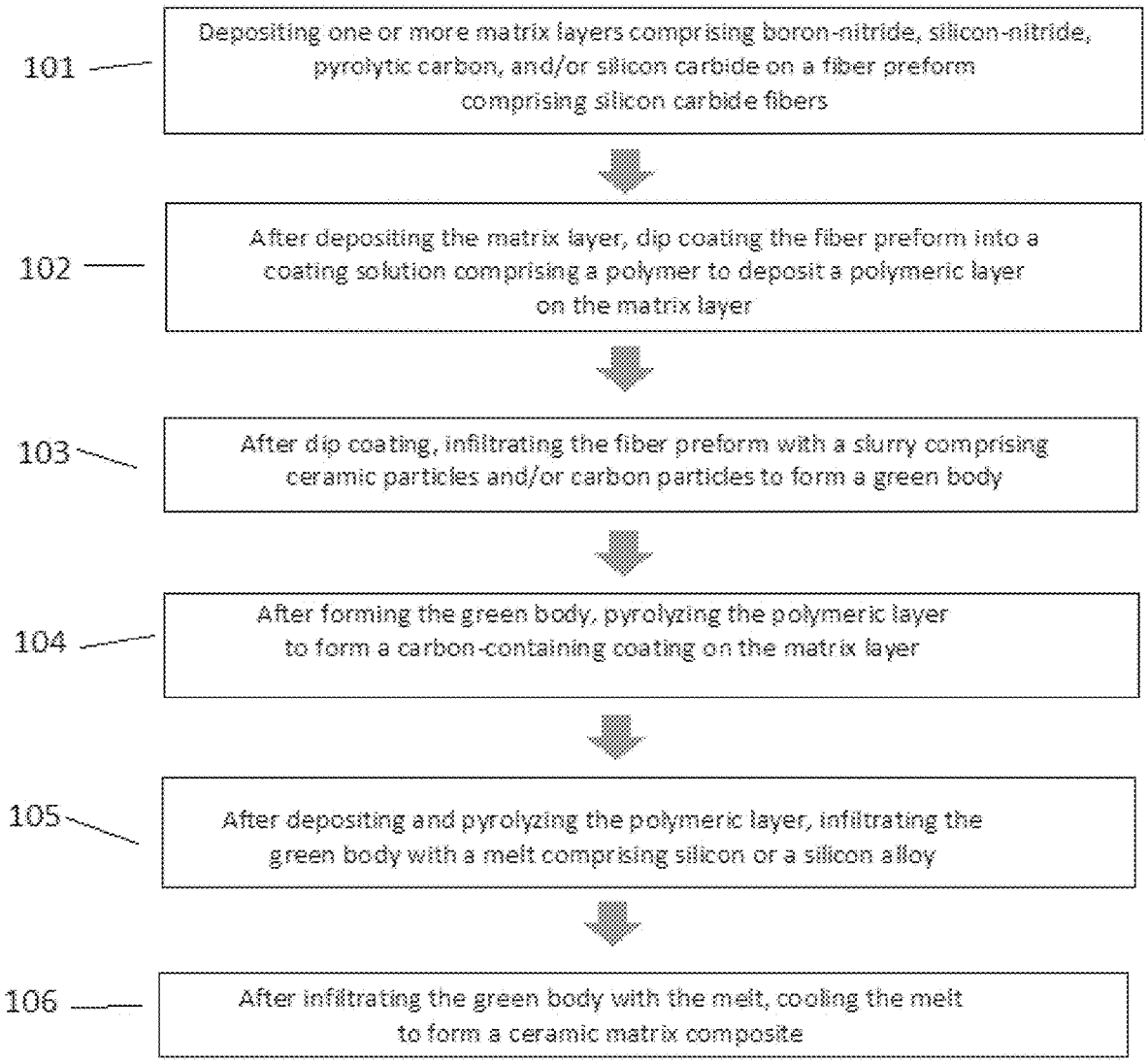
FIG. 1 is a flow chart showing exemplary steps of the method.
Figure 2:
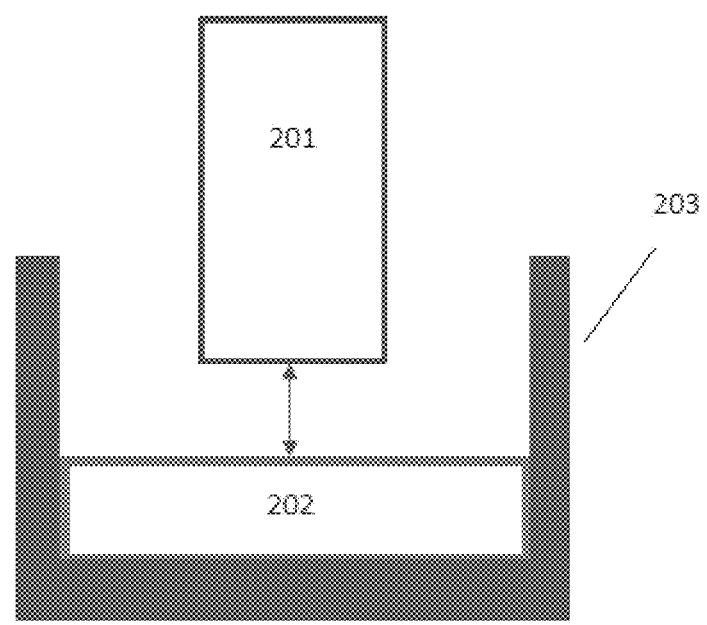
FIG. 2 is a schematic illustration, not to scale, of an example dip coating method.

Referring to FIGS. 1 and 2, the method includes depositing 101 one or more matrix layers comprising boron nitride, silicon nitride, pyrolytic carbon, and/or silicon carbide on a fiber preform comprising one or more silicon carbide fibers. After depositing the matrix layer, the fiber preform 201 is dipped 102 or immersed into a coating solution 202 comprising a polymer to deposit a polymeric layer on the matrix layer. The dipping may be referred to as dip coating. The coating solution may be held in an open container 203 or the like for dip coating. After dip coating, the fiber preform 201 is infiltrated 103 with a slurry comprising ceramic particles and/or carbon particles to form a green body. After forming the green body, the polymeric layer is pyrolyzed 104 to form a carbon-containing coating on the matrix layer. After depositing and pyrolyzing the polymeric layer, the green body may undergo melt infiltration 105. Upon cooling the melt 106, a dense CMC formed may be obtained.

The depositing of the matrix layer on the fiber preform may be carried out using chemical vapor infiltration (CVI) methods, as described below. The matrix layer may have a thickness of about 0.5 micron to about 15 microns. The matrix layer may be substantially free (e.g., free or nearly free) of low temperature oxide formers, such as boron. As indicated above, after depositing the matrix layer using CVI, the fiber preform 201, which may now be referred to as a rigidized preform 201, is dipped or immersed into a coating solution 202 comprising a polymer to deposit a polymeric layer on the matrix layer. Mainly, dip coating is a way of creating a thin and uniform coating onto a substrate. It is recognized that for dip coating, the resultant film properties and film thickness may depend on a number of parameters, such as, immersion time, withdrawal speed, number of dipping cycles, solution composition, and concentration and temperature. The merits of dip coating may include being reliable, reproducible, low cost, short processing time, and the ability to adjust the layer thickness.

The dip coating process can be, generally, separated into three stages: immersion, dwell time and withdrawal. In the first stage, the fiber preform 201 may be partly or fully immersed or dipped into a coating solution 202 comprising a polymer. In some examples, the dipping may occur at a constant speed. After remaining inside the coating solution for a sufficient time for dip coating the fiber preform is pulled up. As with dipping, the withdrawal may occur at a constant speed to enable the coating solution to run back into the solution bath as the preform emerges. After draining and evaporating of excess solution, a thin polymeric residue layer is formed on the preform.

In the method described herein, the coating solution 202 comprises a fluid of a low viscosity having a viscosity of about 200 cp to approximately 1000 cp. The polymer may comprise a high char yield polymer. The high char yield polymer may be selected from the group consisting of pyrolized phenolic, fuferal, pitch, h-resin, polyaryl acetylenes (PAA's) and combinations thereof. The resultant polymeric layer may have a thickness of about 20 nm up to 50 μm.

Preferably, the fiber preform (e.g., rigidized preform) undergoes dip coating once. In some embodiments, the fiber preform undergoes dip coating multiple times.

After dip coating, the fiber preform may be infiltrated by a slurry to impregnate the preform with matrix precursors, forming what may be referred to as a green body. A suitable slurry may include ceramic (e.g., silicon carbide, boron carbide, silicon boride) particles and/or particulate reactive elements (e.g., elements reactive with molten silicon or a molten silicon alloy), such as carbon, in an aqueous or organic liquid.

After forming the green body, the polymeric layer deposited on the fiber preform is pyrolyzed, leaving behind a carbon-containing coating on the matrix layer. In one embodiment, the pyrolysis is completed at a temperature below the melt infiltrate temperature. Preferably, the pyrolysis is completed at a temperature below 1200° C. In another embodiment, the pyrolysis is completed at a temperature at or above the melt infiltrate temperature. For example, pyrolysis can take place at a temperature in the range from about 1380° C. to about 1700° C. In addition, in either or both cases, pyrolysis under these temperature ranges may occur in a separate processing step prior to melt filtration. The pyrolysis may take place as the temperature is increased in preparation for the melt infiltration process. The carbon-containing coating may have a thickness of about 10 nm to about 44 microns.

After depositing and pyrolyzing the polymeric layer, the method described herein may further comprise infiltrating the green body with molten material (e.g., molten silicon or a molten silicon alloy). The molten material infiltrated into the green body may consist essentially of silicon (e.g., elemental silicon and any incidental impurities) or may comprise a silicon-rich alloy. Melt infiltration may be carried out at a temperature at or above the melting temperature of silicon or the silicon alloy which is infiltrated. Thus, the temperature for melt infiltration is typically in a range from about 1380° C. to about 1700° C. In one example, a ramp rate from an intermediate temperature of about 800° C. to a temperature above 1380° C. may be less than about 10° C./min. A suitable time duration for melt infiltration may be from 15 minutes to four hours, depending in part on the size and complexity of the ceramic matrix composite to be formed. After melt infiltration, cooling of the melt may follow to form a densified ceramic matrix composite. The final CMC component may contain an increased carbon content due to the presence of the additional carbon-containing coating. Depending on the density of the carbon phases, the total carbon content may be limited to a maximum of approximately 20 to 50 vol % to prevent chocking during the melt process.

In the method described above, the silicon carbide fibers that undergo coating may be arranged in a fiber tow, unidimensional tape, braid, ply, and/or woven fabric (e.g., 2D woven, 3D woven and/or 2.5D woven), and may further be part of a fiber preform that has a predetermined shape, such as an airfoil shape. The fiber preform is typically produced in a lay-up process from the plies, woven fabrics and/or tapes and may be described as a three-dimensional framework of the silicon carbide fibers or fiber tows. Typically, the silicon carbide fibers are assembled into a fiber preform prior to CVI.

The deposition of additional coatings or layers, such as an interphase coating formed prior to the matrix coating, may be carried out using chemical vapor infiltration (CVI) methods as known in the art. The interphase coating may comprise boron nitride, silicon-doped boron nitride, and/or pyrolytic carbon. The interphase coating may help to ensure a weak fiber-matrix interface in the finished CMC and promote matrix crack deflection, thereby improving fracture toughness.

CVI entails flowing gaseous reagents at an elevated temperature through a furnace or reaction chamber containing one or more porous specimens to be coated. The one or more porous specimens may comprise any arrangement of the fibers (e.g., a fiber preform and/or fiber tows, as discussed below), where interstices between adjacent fibers may be understood to constitute pores. During CVI, the gaseous reagents may infiltrate the porous specimen(s) (e.g. the fiber preform and/or the fiber tows) and chemically react to form a deposit, coating or layer on exposed surfaces of the fibers. The porous specimen(s) may be un-tooled or constrained with a tool during deposition. A suitable tool may include through-holes for passage of the gaseous reagents and may be formed of a chemically inert and/or refractory material, such as graphite or silicon carbide, which is stable at the elevated temperatures at which deposition take place. Through-holes in the tool may have a diameter or width sized to allow for a sufficient flow of gaseous reactants into the porous specimen during CVI. The tool may have a single-piece or multi-piece construction suitable for constraining the porous specimen(s) in a desired configuration and for easy removal after deposition of the coatings.

While various embodiments have been described, it will be apparent to those ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method of making a fiber preform for ceramic matrix composite fabrication. The method comprises depositing one or more matrix layers comprising boron nitride, silicon nitride, pyrolytic carbon, and/or silicon carbide on a fiber preform comprising silicon carbide fibers; after depositing the matrix layer, dipping the fiber preform into a coating solution comprising a polymer to deposit a polymeric layer on the matrix layer, the dipping comprising dip coating; after dip coating, infiltrating the fiber preform with a slurry comprising ceramic particles and/or carbon particles to form a green body; after forming the green body, pyrolyzing the polymeric layer to form a carbon-containing coating on the matrix layer; after depositing and pyrolyzing the polymeric layer, infiltrating the green body with a melt comprising silicon or a silicon alloy; and after infiltrating the green body with the melt, cooling the melt to form a ceramic matrix composite.

A second aspect relates to the method of the first aspect, wherein the coating solution is held in an open container.

A third aspect relates to the method of the first or second aspect, wherein the coating solution comprises a low viscosity fluid having a viscosity of about 200 cp to about 1000 cp.

A fourth aspect relates to the method of any preceding aspect, wherein, during dip coating, the fiber preform is fully immersed in the coating solution.

A fifth aspect related to the method of any preceding aspect, wherein, during dip coating, the fiber preform is partly immersed in the coating solution.

A sixth aspect relates to the method of any preceding aspect, wherein the fiber preform undergoes dip coating once.

A seventh aspect relates to the method of any preceding aspect, wherein the fiber preform undergoes dip coating multiple times.

An eighth aspect relates to the method of any preceding aspect, wherein the polymer comprises a high char yield polymer selected from the group consisting of: pyrolized phenolic, fuferal, furfuryl alcohol, pitch, h-resin, polyaryl acetylenes and combinations thereof.

A ninth aspect relates to the method of any preceding aspect, wherein a thickness of the polymeric layer lies in a range from about 20 nm up to 50 μm.

A tenth aspect relates to the method of any preceding aspect, wherein the polymeric layer is pyrolyzed at a temperature below the melt infiltration temperature.

An eleventh aspect relates to the method of any preceding aspect, wherein the polymeric layer is pyrolyzed at a temperature below 1200° C.

A twelfth aspect relates to the method of any preceding aspect, wherein the polymeric layer is pyrolyzed at a temperature above the melt infiltration temperature.

A thirteenth aspect relates to the method of any preceding aspect, wherein the polymeric layer is pyrolyzed at a temperature from about 1380° C. to about 1700° C.

A fourteenth aspect relates to the method of any preceding aspect, wherein the polymer layer is pyrolyzed prior to infiltration of the green body with the melt.

A fifteenth aspect relates to the method of any preceding aspect, wherein infiltration of the green body with the melt takes place at a temperature in a range from about 1380° C. to about 1700° C.

A sixteenth aspect relates to the method of any preceding aspect, wherein a thickness of the carbon-containing coating lies in a range from about 10 nm to about 44 microns.

A seventeenth aspect relates to the method of any preceding aspect, wherein forming the fiber preform comprises laying up a plurality of plies comprising tows of the silicon carbide fibers.

An eighteenth aspect relates to the method of any preceding aspect, further comprising, prior to depositing the matrix layer, depositing an interphase coating on the fiber preform.

A nineteenth aspect relates to the method of any preceding aspect, wherein the ceramic particles comprise silicon carbide, boron carbide, and/or silicon boride.

A twentieth aspect relates to a ceramic matrix composite made by the method of claim 1.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of making a fiber preform for ceramic matrix composite fabrication, the method comprising:
depositing one or more matrix layers comprising boron nitride, silicon nitride, pyrolytic carbon, and/or silicon carbide on a fiber preform comprising silicon carbide fibers;
after depositing the one or more matrix layers, dipping the fiber preform into a coating solution comprising a polymer to deposit a polymeric layer on the one or more matrix layers, the dipping comprising dip coating, wherein the polymeric layer comprises a thin polymeric residue layer;
after dip coating, infiltrating the fiber preform with a slurry comprising ceramic particles and/or carbon particles to deposit the ceramic particles and/or carbon particles on the polymeric layer and form a green body;
after forming the green body, pyrolyzing the polymeric layer to form a carbon-containing coating on the matrix layer;
after depositing and pyrolyzing the polymeric layer, infiltrating the green body with a melt comprising silicon or a silicon alloy; and
after infiltrating the green body with the melt, cooling the melt to form a ceramic matrix composite.

2. The method of claim 1, wherein the coating solution is held in an open container.

3. The method of claim 1, wherein the coating solution comprises a low viscosity fluid having a viscosity of about 200 centipoise (cp) to about 1000 cp.

4. The method of claim 1, wherein, during dip coating, the fiber preform is fully immersed in the coating solution.

5. The method of claim 1, wherein, during dip coating, the fiber preform is partly or fully immersed in the coating solution.

6. The method of claim 1, wherein the fiber preform undergoes dip coating once.

7. The method of claim 1, wherein the fiber preform undergoes dip coating multiple times.

8. The method of claim 1, wherein the polymer comprises a high char yield polymer selected from the group consisting of: pyrolized phenolic, fuferal, furfuryl alcohol, pitch, h-resin, polyaryl acetylenes, and combinations thereof.

9. The method of claim 1, wherein a thickness of the polymeric layer lies in a range from about 20 nanometers (nm) up to 50 micrometers (μm).

10. The method of claim 1, wherein the polymeric layer is pyrolyzed at a temperature below a melt infiltration temperature of the melt.

11. The method of claim 10, wherein the polymeric layer is pyrolyzed at a temperature below 1200 degrees Celsius (° C.).

12. The method of claim 1, wherein the polymeric layer is pyrolyzed at a temperature above a melt infiltration temperature of the melt.

13. The method of claim 12, wherein the polymeric layer is pyrolyzed at a temperature from about 1380° C. to about 1700° C.

14. The method of claim 1, wherein the polymeric layer is pyrolyzed prior to infiltration of the green body with the melt.

15. The method of claim 1, wherein infiltration of the green body with the melt takes place at a temperature in a range from about 1380° C. to about 1700° C.

16. The method of claim 1, wherein a thickness of the carbon-containing coating lies in a range from about 10 nm to about 44 μm.

17. The method of claim 1, wherein forming the fiber preform comprises laying up a plurality of plies comprising tows of the silicon carbide fibers.

18. The method of claim 1, further comprising, prior to depositing the matrix layer, depositing an interphase coating on the fiber preform.

19. The method of claim 1, wherein the ceramic particles comprise silicon carbide, boron carbide, and/or silicon boride.

* * * * *